Dec. 8, 1970           E. MIDDLETON           3,545,164
APPARATUS AND METHOD FOR FILLING PACKAGING RECEPTACLES
Filed Aug. 22, 1968           2 Sheets-Sheet 1
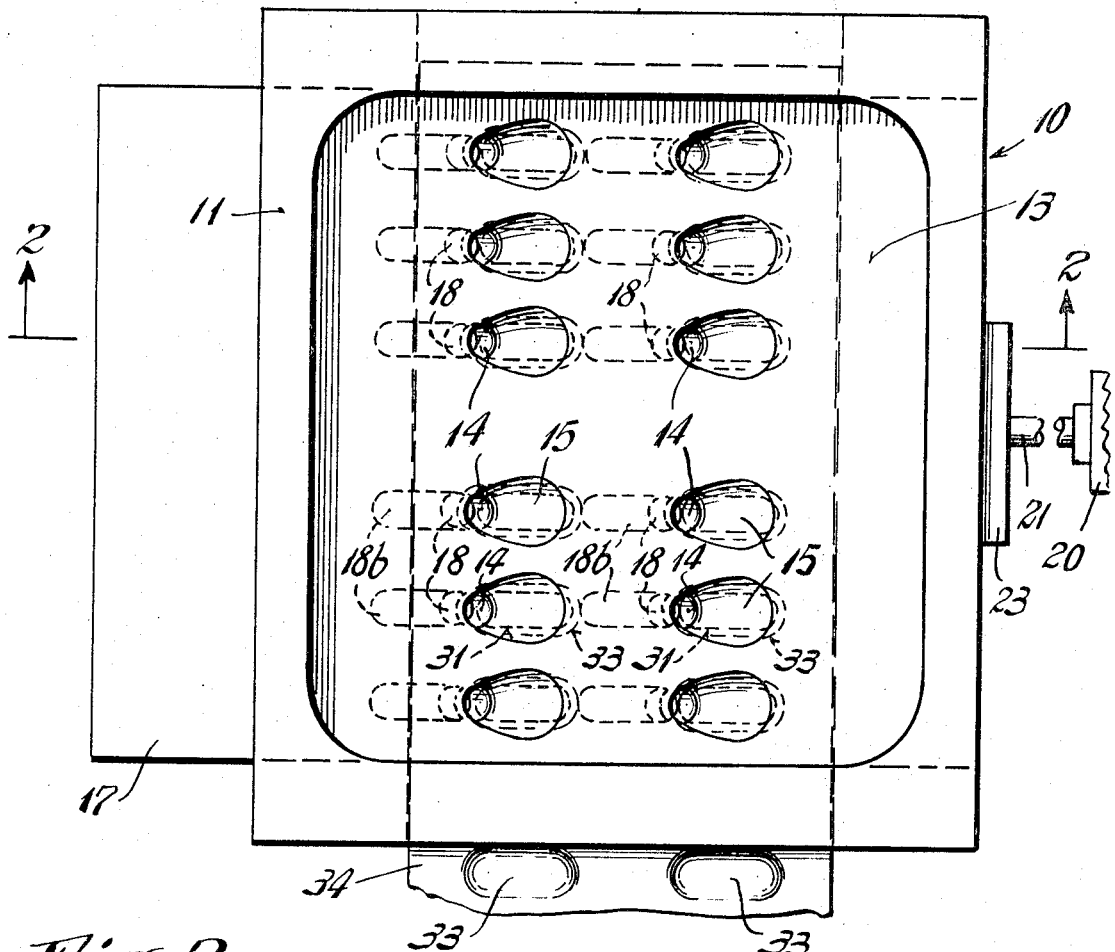
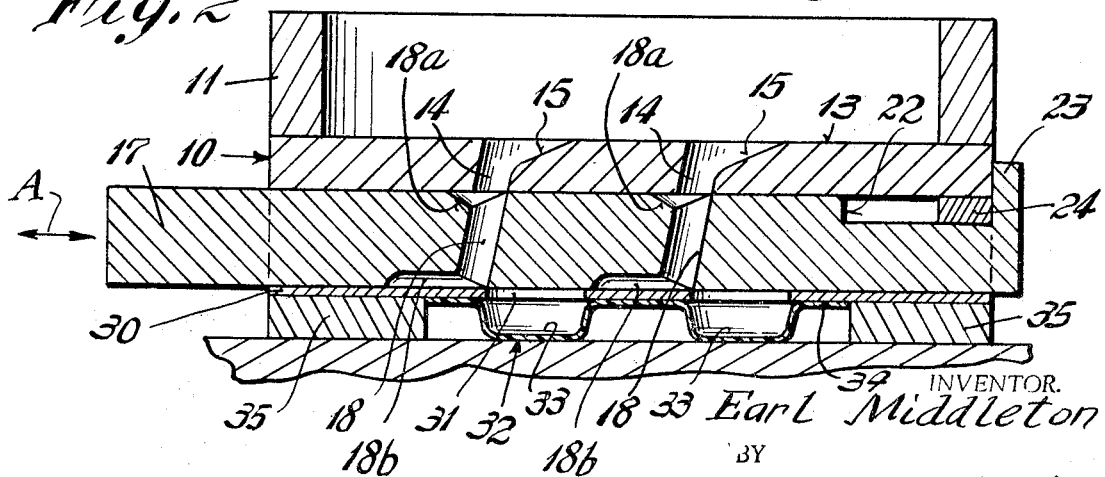
INVENTOR.
Earl Middleton
BY
Johnson and Kline
ATTORNEYS INVENTOR.
Earl Middleton
BY
Johnson and Kline
ATTORNEYS

United States Patent Office 3,545,164
Patented Dec. 8, 1970

3,545,164
APPARATUS AND METHOD FOR FILLING PACKAGING RECEPTACLES
Earl Middleton, Weston, Conn., assignor to Warnaco, Inc., Bridgeport, Conn., a corporation of Connecticut
Filed Aug. 22, 1968, Ser. No. 754,621
Int. Cl. B65b 35/30
U.S. Cl. 53—26       10 Claims

ABSTRACT OF THE DISCLOSURE

An apparatus and method for segregating, orienting and packaging elongate articles, such as capsules, wherein the articles are separated and turned from a horizontal position to a substantially vertical position and fed to and stored in a substantially vertical position in a transfer plate. They are moved by the transfer plate to a position over a receptacle and disposed in the receptacle to lie in a predetermined horizontal position therein. The receptacles are then closed and sealed.

---

Heretofore in packaging elongate articles, and particularly capsules, they were manually placed in the package receptacles because attempts to do it automatically had presented problems of jamming and/or damaging the capsules, resulting in a time-consuming and costly operation.

The present invention overcomes these difficulties by providing an apparatus and a method for automatically separating and segregating a plurality of elongate articles from a supply of horizontally disposed articles, orienting said articles and storing said articles with their elongate axes in a substantially vertical position, and feeding the article under control of a control means into a plurality of packaging receptacles without jamming or damaging the articles.

This is accomplished by having at least three superposed, relatively movable plates. The top plate supports a supply of articles and has means for separating articles from the supply and guiding and orienting them into substantially vertical through passages. Below the top plate is a transfer and storage plate having through passages aligned with the passages in the top plate when in normal position to receive and store the elongate articles. A control or release plate blocks the lower end of the passages in the storage and transfer plate until relative movement between the control plate and storage and transfer plate causes an elongate opening in the control plate to be aligned with the through passages in the storage and transfer plate and permits the articles to simulaneously drop and be positioned in a horizontal position in packaging receptacles disposed below the control plate.

A feature of the invention resides in the provision of means on the transfer plate for controlling the articles during movement of the plate from storage to filling position.

The novel method accurately and automatically controls the movement of a plurality of articles from a supply and deposits them in packaging receptacles without jamming or damage.

Figure 3:
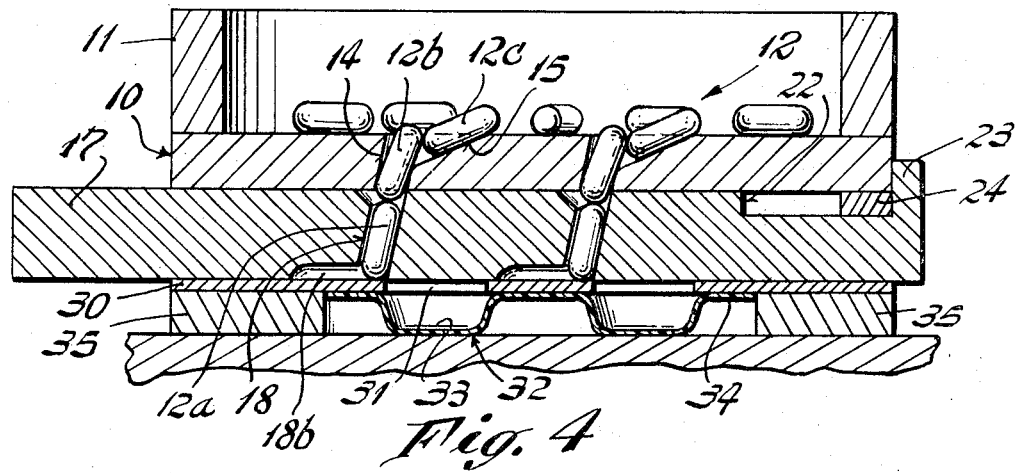
Figure 4:
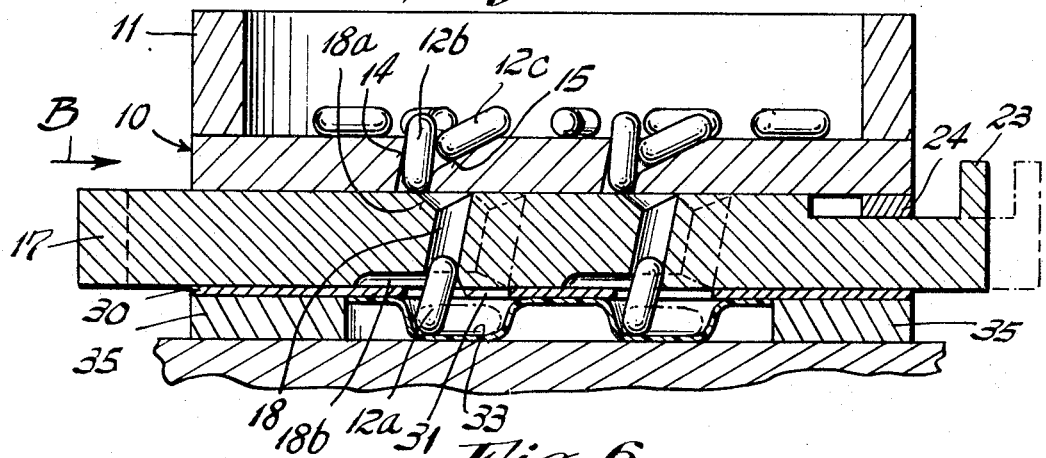
Figure 6:
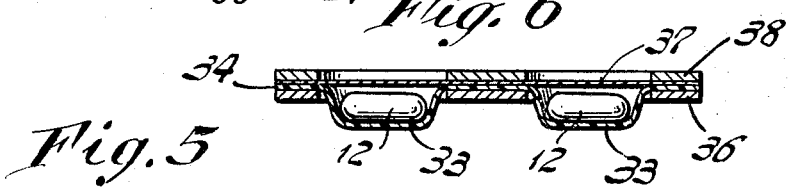
Figure 5:
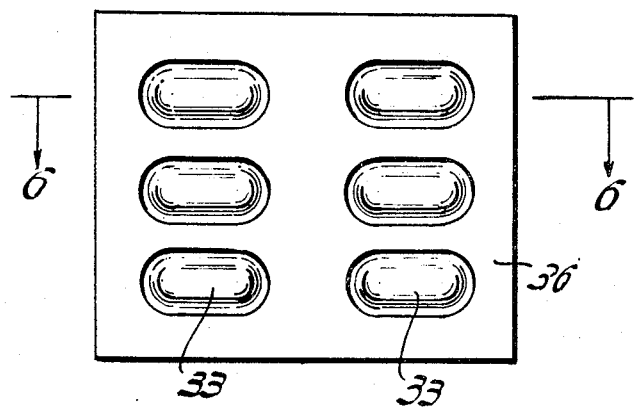

Other features and advantages of the invention will be apparent from the specification and claims when taken in connection with the accompanying drawings in which:

FIG. 1 is plan view of the device.
FIG. 2 is a sectional view taken along line 2—2 of FIG. 1.
FIG. 3 is a view similar to FIG. 2 showing the capsules in position.
FIG. 4 is a view similar to FIG. 3 showing the start of the delivery of the capsule to the receptacle.
FIG. 5 is a multiple package of capsules.
FIG. 6 is a section taken along line 6—6 of FIG. 5.

According to the present invention a plurality of elongate articles are simultaneously deposited in packaging receptacles. While various articles may be used and any desired number of packaging receptacles filled simultaneously, for the purpose of illustrating the invention, the device is shown as handling a dozen articles herein illustrated as capsules such as used in the pharmaceutical or drug field.

The device has a top plate 10 having side walls 11 forming a means for receiving a supply of capsules 12 which are supported on the top surface 13 with their major axes in a horizontal position. The top plate has a plurality of spaced, substantially vertical through passages 14 having their upper ends each.merging with an inclined guide mouth 15 formed in the said surface 13. The guide mouth 15 is preferably shaped as shown in FIG. 1.

When the capsules in the supply are agitated as by a vibrator or a brush (not shown), they will enter the guide mouths and be separated from the supply and then will be oriented or turned and pass into the through passages 14 to be positioned therein with the major axis of the capsule substantially vertical.

Located below the top plate is a storage and transfer plate 17 having through passages 18 aligned, when in normal storage position, with the through passages 14 in the top plate so as to receive capsules therefrom and store them. The through passages are slightly inclined in the direction of movement of the plate as shown in FIG. 2 and have a diameter to readily pass the capsules and maintain them in their oriented position with the major axes in a substantially vertical position. The length of passages 18 is at least equal to and preferably is slightly greater than the length of the article or capsule to be stored.

Immediately below the plate 17 is a control or release plate 30 which closes the bottom of the passage 18 when the plate is in storage position. The storage plate and release plate are relatively movable with respect to one another in order to bring elongate release openings 31 into communication with the passages 18 in a filling position. In the illustrated and preferred form of the invention the plate 17 is slidably mounted for movement in the direction of arrows A relative to the fixed control plate 30. The openings 31 extend in the direction of movement of the plate 17 and are disposed over the packaging receptacles 32 which are to receive the capsules 12. Plate 17 is normally urged to the storage position and moved to filling position. This can be accomplished in many ways as by springs or mechanical means. However, in the illustrated form of the invention it is accomplished by an air cylinder 20 connected by piston rod 21 to the plate 17 to normally urge the plate to the position of FIG. 3 and when energized moves the plate to the right to the filling position as shown in dot-and-dash position in FIG. 4. The plate 17 is located in storage or filling positions by abutments 22, 23 engaging the locating strip 24.

While the receptacles can be formed in many ways, it is preferred to form them as blisters 33 in strips or sheets of plastic 34 with the strips slidable between the side rails 35 as shown in FIGS. 1 and 2. The strips of receptacles can be formed as separate sheets, or as illustrated, can be a continuous strip which is stepped the required distance for each operation of the machine to provide receptacles for each of the through passages in the plates. After the receptacles are filled, they are closed and sealed to complete the package and seal the capsule therein.

In the form of the invention illustrated, the strip 34 is assembled with a perforated cardboard sheet 36 with the blisters 33 disposed in the perforations. A foil sealing sheet 37 is disposed over the receptacles and a second perforated carboard 38 is secured in place as shown in FIG. 6. Thereafter, the package is severed from the sheets to form a six capsule package as shown in FIG. 5.

A feature of the invention resides in the formation of a cam surface 18a on the trailing side of the upper end of the through passage 18 which lifts the capsule in passage 14, which may extend partially into the passage 18, as shown in FIG. 3 to the position shown in FIG. 4 wherein it rests on the top surface of plate 17, thus preventing damage to the capsule by a shearing action of the ends of the through passages as might occur if the capsule remains in the position of FIG. 3.

Also, the plate 17 has a guide channel 18b on the trailing edge of the bottom of the through passage 18 which engages the upper end of the capsule that has dropped end first into the elongate receptacle and will guide it into a horizontally filled position as shown in dot-and-dash lines in FIG. 4 in response to continued movement of the plate 17 to the filling position as shown in the dot-and-dash lines.

The operation of the device can be understood by referring to FIGS. 3 and 4 wherein it is shown that a supply of capsules 12 is disposed on the upper surface 13 of the top plate 10. One capsule 12a has been deposited in each passage 18 in the storage plate. The capsule 12b has been oriented into a substantially vertical position in each passage 14 in the top plate, and the capsule 12c has been moved into each inclined mouth 15. This is the normal condition of the capsules in normal storage position.

When it is desired to fill the receptacles, the plate moves in the direction of the arrow B in FIG. 4. Initial movement of the plate will cause the cam surface 18a to engage the bottom of capsule 12b and lift it to the position shown in FIG. 4, in which position the top of the plate 17 will support the capsule 12b against dropping. It will be noticed that the cam will lift the capsule 12b above the edge of the plate 17 so that there will be no danger of damage to the capsule by the plate as it moves to the position of FIG. 4. The passage 18 will be moved into communication with the passage 31 in the plate 30 and will permit the capsule to drop to the position shown in FIG. 4. Continued movement of the plate 17 in the direction of the arrow B will cause the guide groove 18b to engage the capsule to guide and turn it upon its lower end to the horizontal dot-and-dash filled position in the receptacle. This will properly locate the capsule in the receptacle without any possibility of jamming. Thereafter, the strip 34 is fed out of the machine and the plate 17 returned to its initial storage position. As the plate moves back to its storage position the cam surface will permit the capsule 12b to drop into the storage position in the storage plate and will enable the capsule 12c to move into the oriented position and permit another capsule to take up its position in the mouth 15.

After the strip having the filled receptacles has been severed, it is assembled with the apertured cardboard sheet 36 and a foil sheet 37 is inserted over the receptacle to close it and an apertured second carboard sheet 38 is secured to the top to overlie the foil sheet, leaving only the foil above the receptacle exposed for easy extraction of the capsule.

While the foregoing has been described in conjunction with the simultaneous filling of twelve receptacles with capsules, it is understood that by making the plates of sufficient size any number of receptacles can be filled simultaneously with elongate articles. The receptacles can be in sheets of sufficient size to underlie all of the passages in the plates or can be a plurality of strips, such as shown in FIG. 1, arranged in side-by-side relation.

The present invention thus enables the simultaneous filling of a large number of packaging receptacles quickly, accurately and without damage to the articles being packaged.

Variations and modifications may be made within the scope of the claims and portions of the improvements may be used without others.

I claim:

1. An apparatus for segregating, orienting and packaging elongate articles comprising a supply of horizontally disposed elongate articles, means separating a plurality of articles from the supply and orienting said elongate articles into spaced, substantially vertical positions, means storing said oriented articles in a vertical position over a plurality of horizontally disposed packaging receptacles, and means including control means simultaneously feeding said stored, vertically disposed elongate articles into said plurality of packaging receptacles disposed below said storage means and turning said vertically disposed articles into a horizontal position incident to the feeding thereof into said receptacles.

2. An apparatus for segregating, orienting and packaging elongate articles comprising a top plate having a top surface for supporting a supply of said articles in a horizontal position, said plate having a plurality of substantially vertical passages therethrough, the upper end of each merging with an inclined guide mouth formed in the support surface whereby the articles, when moved on the support surface, enter the guide mouth and move into a position in which the elongate axis of each is in a substantially vertical position in said passage in the plate, a movable transfer plate disposed below the top plate and movable between a storage and a filling position, said plate having a plurality of substantially vertical through passages therein, said last-named passages being aligned with the passages in the top plate when the transfer plate is in storage position to receive and store elongate articles from the passages in the top plate, said passages on the transfer plate being at least equal to the length of the articles, a release plate below said transfer plate, said release plate blocking the end of the passages in the transfer plate in said storage position thereof and having a plurality of spaced elongate release openings therein extending in the direction of movement of said transfer plate and communicating with the passages in the transfer plate in said filling position thereof, and receptacle means having article-receiving receptacles disposed below each release opening to receive elongate articles dropped from the through passages in the transfer plate through said release opening.

3. The invention as defined in claim 2 wherein the upper trailing edge of each through passage in the transfer plate has a cam surface thereof to engage the end of an elongate article which may be partially located in the passage and raise it out of the passage as an incident to the movement of the transfer plate from said storage position.

4. The invention as defined in claim 2 wherein the lower trailing edge of each through passage on the transfer plate has a guide groove communicating therewith to control the article as the articles drop through said elongate opening in the release plate during the movement of the passage along said elongate opening to cause the elongate article to be positioned horizontally in said recepacle as an incident to the movement of the transfer plate in said filling position.

5. The invention as defined in claim 2 wherein the through passages are slightly inclined in the direction of movement of the transfer plate and have a cross-section sufficient to readily pass the elongate article while maintaining the position thereof with the elongate axis in a substantially vertical position.

6. The invention as defined in claim 2 wherein there is an air cylinder means for maintaining said transfer plate in storage position and for moving the plate to filling position.

7. In the method of packaging elongate articles, the step of supporting on a top plate a supply comprising a plurality of elongate articles with the major axis thereof in a horizontal position, guiding and turning said elongate articles to locate the major axis in a substantially vertical position and inserting said articles into first substantially vertical through passages, feeding said elongate articles into second through-passages in a movable transfer and storage plate disposed below the top plate when in normal storage position, with said through passages in alignment, each of said second passages completely holding and storing one of said articles, closing the bottom of said second passages in storage position of the transfer plate by a release plate, and relatively moving said transfer plate and release plate to cause said second through passages, each with an article stored therein, to move into communication with an elongate horizontal opening in said release plate disposed over a horizontal receptacle, said stored article dropping through the elongate opening and turning to a horizontal position in said receptacle.

8. The invention as defined in claim 7 wherein the plurality of stored elongate articles drop simultaneously into a plurality of spaced receptacles to fill the same when said transfer plate is moved to filling position.

9. The invention as defined in claim 7 comprising the step of guiding said stored elongate article as it drops from the second passage to cause the article to assume a predetermined horizontal position in the receptacle.

10. The invention as defined in claim 8 wherein the filled receptacle is removed from below the opening in the release plate and is sealed to enclose said article.

References Cited
UNITED STATES PATENTS

| | | | |
|---|---|---|---|
| 2,865,156 | 12/1958 | Wolfson | 221—93X |
| 2,945,335 | 7/1960 | Nicolle | 221—156X |
| 3,435,589 | 4/1969 | Horton | 53—390 |

THERON E. CONDON, Primary Examiner

R. L. SPRUILL, Assistant Examiner

U.S. Cl. X.R.

53—37, 166, 247; 221—156, 264